US005254805A

United States Patent [19]

Iizuka

[11] Patent Number: 5,254,805

[45] Date of Patent: Oct. 19, 1993

[54] ELECTRONIC MUSICAL INSTRUMENT CAPABLE OF ADDING MUSICAL EFFECT TO MUSICAL TONES

[75] Inventor: Akira Iizuka, Hamamatsu, Japan

[73] Assignee: Yamaha Corporation, Hamamatsu, Japan

[21] Appl. No.: 671,349

[22] Filed: Mar. 19, 1991

[30] Foreign Application Priority Data

Mar. 20, 1990 [JP] Japan .................................... 2-70507

[51] Int. Cl.$^5$ ........................ G10H 7/00; G10H 1/02; G01P 3/00

[52] U.S. Cl. ........................................ 84/626; 84/624; 84/629

[58] Field of Search ................. 84/601, 604, 624, 626, 84/629, 662, 701, 705, 706

[56] References Cited

U.S. PATENT DOCUMENTS

| | | | |
|---|---|---|---|
| 4,026,180 | 5/1977 | Tomisawa et al. . | |
| 4,602,546 | 6/1986 | Shinohara | 84/609 |
| 4,915,007 | 4/1990 | Wachi et al. | 84/622 |
| 5,001,960 | 3/1991 | Katou | 84/735 |
| 5,033,352 | 6/1991 | Kellogg et al. | 84/658 |
| 5,054,358 | 10/1991 | Usami | 84/617 |
| 5,076,133 | 12/1991 | Toda | 84/624 |
| 5,081,898 | 1/1992 | Fujimori | 84/622 |

*Primary Examiner*—William M. Shoop, Jr.
*Assistant Examiner*—Jeffrey W. Donels
*Attorney, Agent, or Firm*—Spensley Horn Jubas & Lubitz

[57] ABSTRACT

An electronic musical instrument has a low frequency oscillator (LFO) for generating a low-frequency signal to impart musical effect such as vibrato to musical tones, and a plurality of tone generating channels. The LFO comprises a random access memory (RAM), a feedback loop, and a waveform generator. The LFO generates the low-frequency signal in accordance with the designated RAM addresses corresponding to the designated tone color to impart a same phase musical effect to the plurality of channels having same tone color. As a result, favorable musical tone effect is realized

16 Claims, 4 Drawing Sheets

ELECTRONIC MUSICAL INSTRUMENT CAPABLE OF ADDING MUSICAL EFFECT TO MUSICAL TONES

BACKGROUND OF THE INVENTION

1. Field of the Invention

The present invention relates to an electronic musical instrument and, more particularly, to an electronic musical instrument which can add an in-phase musical effect (e.g., vibrato, tremolo, or wow effect) to tones generated by a plurality of tone generation channels to which the same tone color is assigned.

2. Description of the Prior Art

Conventionally, a technique for adding a vibrato effect to a musical tone generated by each tone generation channel (a series of circuits for generating a musical tone in a specific tone color) by using shift registers and adders is known.

For example, Japanese Patent Publication No. Sho 57-22399 discloses an electronic keyboard instrument which has a plurality of tone generation channels and can add a vibrato effect to each of tones with each phases. In this electronic keyboard instrument, frequency data as a constant proportional to a frequency corresponding to a depressed key (frequency of a tone to be generated) is repetitively accumulated at regular time intervals, and a musical tone waveform memory is accessed at the intervals using the accumulation result as an address signal. The musical tone waveform memory stores amplitude of waveforms of musical tones at sequential sampling points. Therefore, the amplitude of the waveform of a musical tone at the respective sampling points are sequentially read out based on the address signal. In this electronic keyboard instrument, the value of the frequency data is periodically changed to add a vibrato effect. More specifically, since the frequency data is accumulated at regular time intervals, if the value of the frequency data is constant, the rate of increase of the address signal is constant, and a frequency of a musical tone waveform read out from the musical tone waveform memory is also constant. Meanwhile, if the value of the frequency data is periodically changed, the rate of increase of the address signal is also periodically changed, and the frequency of the musical tone waveform read out from the musical tone waveform memory is also periodically changed. Thus, the vibrato effect can be obtained.

In order to periodically change the value of the frequency data, a low-frequency oscillator (to be abbreviated to as an LFO hereinafter) is used. The value of the frequency data is periodically modulated based on an output from the LFO.

The LFO comprises a cyclic shift register having a plurality of storage areas, and an adder. Data stored in the storage areas of the shift register are sequentially shifted in response to clock pulses. Data outputted from the last storage area of the shift register is inputted to the adder, and is added to a predetermined value. The output from the adder is inputted to the first storage area of the shift register. Thus, the shift register and the adder constitute a loop circuit. An output is extracted from an appropriate position of this loop circuit (e.g., from the last storage area), and is used as an output from the LFO. The shift register has the storage areas corresponding in number to the tone generation channels.

The pulse intervals (time slots) of the clock pulses sequentially correspond to the tone generation channels. That is, the time slots correspond to the first channel, the second channel, . . . in turn. The last channel is followed by the first channel.

Therefore, the LFO independently and sequentially outputs output signals corresponding to the respective tone generation channels in a time-divisional manner.

According to the above-mentioned prior art technique, a vibrato effect is added from the point of time when an ON event of a key is detected. More specifically, an output from the LFO for adding the vibrato effect is independently added to each of tone generation channels.

Recent electronic musical instruments can set a plurality of tone colors, and can assign some tone generation channels to each tone color. In such an electronic musical instrument, a musical effect such as a vibrato effect must be added to musical tone in each of tone generation channels by using the LFO.

However, when a vibrato effect is independently added to a plurality of musical tones having the same tone color, which are generated by different channels, a phase shift occurs among the respective musical tones. As a result, the generated tones are unpleasant to the ear. For this reason, when a vibrato effect is added to a plurality of musical tones having the same tone color, all the musical tones having the same tone color must be accumulated, and the musical tones must be generated after data are all accumulated or a plurality of data must be derived from middle areas of a shift register, and must be synthesized, resulting in cumbersome processing. It is very difficult (or impossible) for hardware to realize processing for accumulating musical tones having the same tone color or deriving data from middle areas of the shift register and synthesizing these data.

Moreover, since the shift register must have storage areas corresponding in number to channels, a storage capacity is undesirably increased.

SUMMARY OF THE INVENTION

It is an object of the present invention to provide an electronic musical instrument which can more naturally add a musical effect such as a vibrato in each of tone colors.

It is another object of the present invention to provide an electronic musical instrument which does not require a complex hardware arrangement having a large capacity.

An electronic musical instrument according to the present invention, comprises memory means for storing tone color data for specifying a tone color assigned to each channel, random-access memory means for storing effect data for adding a musical effect to a musical tone in each of tone colors, and outputting, on the basis of tone color data read out from the memory means, effect data corresponding to a tone color specified by the readout tone color data, and means for adding the musical effect to the musical tone on the basis of the effect data outputted from the random-access memory means.

When a musical tone is generated by a given channel, the memory means is accessed to obtain tone color data for specifying a tone color assigned to the given channel. Effect data stored in the random-access memory means is read out using the tone color data as an address. A musical effect is added to the musical tone in the given channel on the basis of the readout effect data. Therefore, if the same tone color is assigned to different channels, since the effect data can be read out from the same address, a natural effect can be added in units of tone colors.

The musical effect which may be added is, e.g., a vibrato, tremolo, or wow effect.

The effect data stored in the random-access memory means is preferably data which is sequentially updated at regular time intervals. For example, amplitude data of a low-frequency signal are sequentially output as the effect data.

The electronic musical instrument may further comprise memory means for storing type data of a waveform of the low-frequency signal, and a waveform formation logic for processing the effect data and outputting the processed effect data so that the effect data can be outputted in accordance with a waveform specified by the type data read out from the memory means. As the waveform, for example, a sawtooth wave, a rectangular wave, or a triangular wave is used.

The electronic musical instrument may further comprise memory means for storing coefficients for controlling an amplitude of the waveform of the low-frequency signal, and multiplier means for accumulating the effect data with a coefficient read out from the memory means, and outputting the product.

The electronic musical instrument may further comprise memory means for storing coefficients for controlling a frequency of the low-frequency signal, and means for increasing/decreasing an updating time interval of the effect data in accordance with a coefficient read out from the memory means.

As the effect data stored in the random-access memory means, random number data may be used. More specifically, the instrument may comprise random number generation means for outputting random number data to the random-access memory means at regular time intervals.

The electronic musical instrument may further comprise memory means for storing coefficients for controlling a generation time interval of random number data by the random number generation means, and the random number generation means may generate random number data at time intervals according to the coefficient read out from the memory means.

The electronic musical instrument may further comprise memory means for storing coefficients to be accumulated with the random number data, and multiplier means for multiplying the random number data with the coefficient read out from the memory means, and outputting the product as the effect data.

In addition, the electronic musical instrument may further comprise means for selecting whether the amplitude data of the low-frequency signal or the random number data is used as the effect data.

DETAILED DESCRIPTION OF THE PREFERRED EMBODIMENT

An embodiment of the present invention will be described below with reference to the accompanying drawings.

Figure 1:
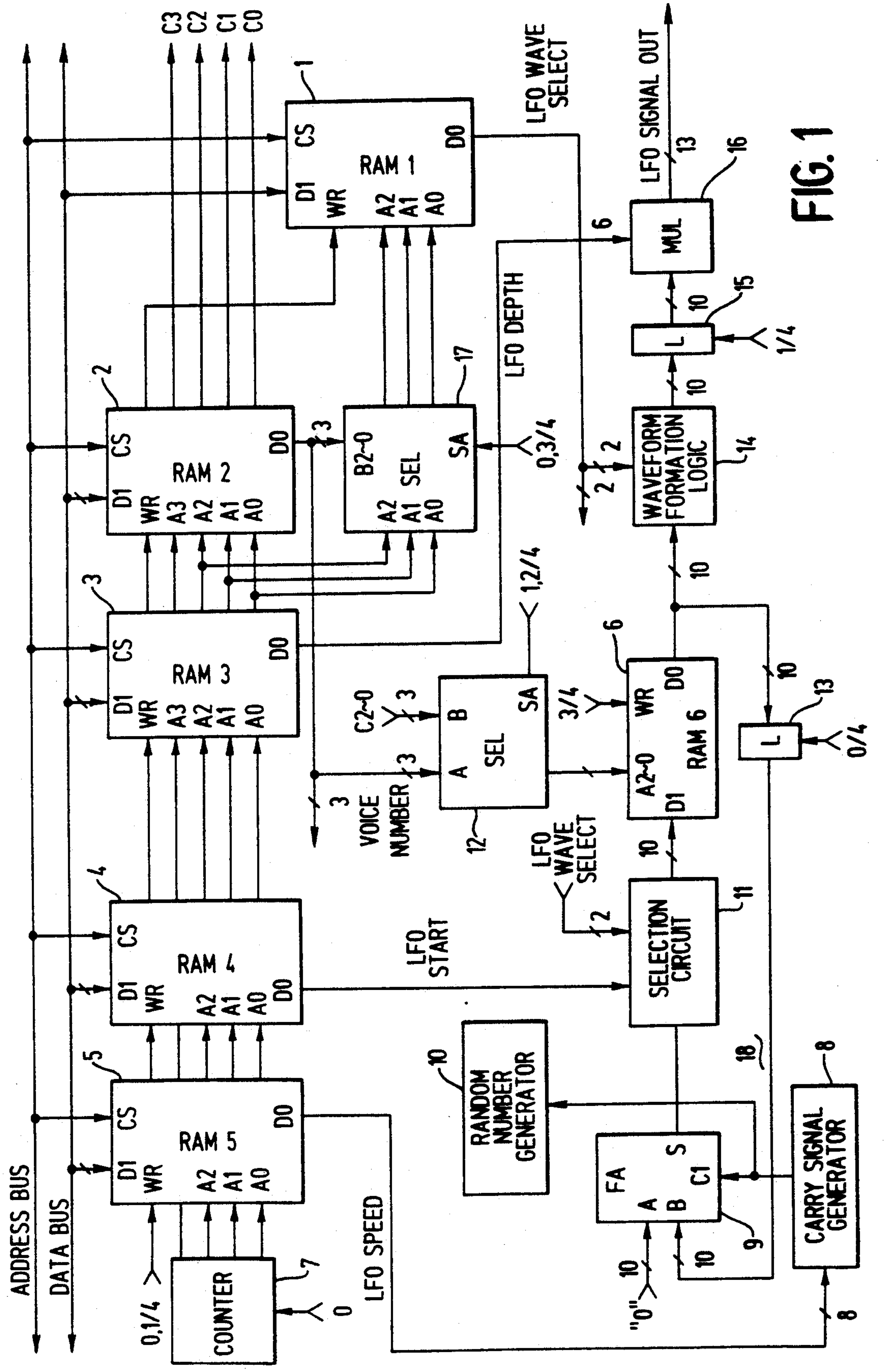
FIG. 1 is a block diagram of an LFO according to an embodiment of the present invention.

FIG. 1 is a block diagram of an LFO of an electronic musical instrument according to an embodiment of the present invention. The electronic musical instrument described in this embodiment is a polyphonic electronic musical instrument having eight voices (eight tone colors), and 16 tones (tone generation channels). Eight or less tone colors can be arbitrarily assigned to the 16 tone generation channels. For example, one tone color (voice) may be assigned to all the 16 tones, or eight tone colors may be prepared in units of two channels. The 16 tone generation channels will be called the first channel, the second channel, . . . , the sixteenth channel in turn.

The LFO shown in FIG. 1 sequentially outputs digital data indicating amplitudes of an output waveform of a low-frequency signal at each sampling points in each tone colors. This digital data will be referred to as LFO SIGNAL OUT hereinafter.

In FIG. 1, arrow lines connecting respective circuits represent flows of data. An arrow line with a slash represents that data consists of a plurality of bits. A numerical value written near the slash represents the number of bits. For example, a value "13" is written near an arrow line indicating the data LFO SIGNAL OUT as an output from this LFO, and this represents that the data LFO SIGNAL OUT is 13-bit data.

In FIG. 1, reference numeral 1 denotes a random-access memory (RAM) for storing numbers (LFO WAVE SELECT Nos.) of output waveforms of the LFO corresponding to tone colors, respectively. The LFO WAVE SELECT No. corresponding to one tone color is expressed by 2 bits. Since eight tone colors can be set, the RAM 1 has a capacity of 2 bits/voice×8 voices=16 bits. The RAM 1 is accessed using tone color data as an address. The tone color data specify one of eight tone colors. The tone color data can have a value between "0" and "7" in decimal notation. A storage area (2 bits) of an address "0" of the RAM 1 stores the LFO WAVE SELECT No. for the first tone color. Storage areas (each having 2 bits) of the remaining addresses "1" to "7" of the RAM 1 respectively store the LFO WAVE SELECT Nos. for the second to eighth tone colors. A correspondence between the LFO WAVE SELECT Nos. as storage contents and waveforms is as follows:

$(00)_2$ Sawtooth Wave
$(01)_2$ Rectangular Wave
$(10)_2$ Triangular Wave
$(11)_2$ Random Number Note that $(XX)_2$ indicates binary notation.

Reference numeral 2 denotes a RAM for storing tone color data (VOICE NUMBER) for specifying tone colors assigned to the respective channels. The data VOICE NUMBER assigned to one channel is expressed by 3 bits, and has a value between "0" to "7" in decimal notation. Since the 16 channels are available, the RAM 2 has a capacity of 3 bits/channel×16 channels=48 bits. The RAM 2 is accessed by a value ("0" to "15" in decimal notation) of a counter 7 as an address. The value of the counter 7 specifies one of the 16 channel. A storage area (3 bits) of an address "0" of the RAM 2 stores data VOICE NUMBER assigned to the first channel. Storage areas (each having 3 bits) of the remaining addresses "1" to "15" of the RAM 2 similarly store data VOICE NUMBER assigned to the second to sixteenth channels, respectively.

Reference numeral 3 denotes a RAM for storing variables (LFO DEPTH) for controlling a degree of modulation (depth of the LFO) in units of channels. Data LFO DEPTH assigned to each channel is expressed by 6 bits, and has a value between "0" to "63" in decimal notation. The RAM 3 has a capacity of 6 bits/channel×16 channels=96 bits. The RAM 3 is accessed by the value of the counter 7 as an address like in the RAM 2. A storage area (6 bits) of an address "0" of the RAM 3 stores data LFO DEPTH assigned to the first channel. Storage areas (each having 6 bits) of the remaining addresses "1" to "15" of the RAM 3 similarly store data LFO DEPTH assigned to the second to sixteenth channels, respectively.

Reference numeral 4 denotes a RAM for storing data (LFO START) indicating whether or not the LFO is enabled for each tone color (whether or not, e.g., a vibrato effect is added). Data LFO START for one tone color is expressed by one bit. The RAM 4 has a capacity of 1 bit/voice×8 voices=8 bits. The RAM 4 is accessed using tone color data as an address. In practice, the RAM 4 is accessed using lower 3 bits of the counter 7 as an address. A storage area (1 bit) of an address "0" of the RAM 4 stores data LFO START for the first tone color. Storage areas (each having 1 bit) of the remaining addresses "1" to "7" of the RAM 4 similarly store data LFO START for the second to eighth tone colors, respectively. Data LFO START represents:

"0": Enable LFO

"1": Disable LFO

Reference numeral 5 denotes a RAM for storing data (LFO SPEED) for determining a speed (e.g., a vibrato speed) of the LFO for each tone color. Data LFO SPEED for one tone color is expressed by 8 bits, and has a value between "0" to "255" in decimal notation. The RAM 5 has a capacity of 8 bits/voice×8 voices=64 bits. The RAM 5 is accessed using tone color data as an address. In practice, the RAM 5 is accessed using lower 3 bits of the counter 7. A storage area (8 bits) of an address "0" of the RAM 5 stores LFO SPEED data for the first tone color. Storage areas (each having 8 bits) of the remaining addresses "1" to "7" of the RAM 5 similarly store data LFO SPEED for the second to eighth tone colors, respectively.

Reference numeral 6 denotes a RAM having eight storage areas, i.e., eight words necessary for calculating LFO output values for eight tone colors. Note that one word=10 bits herein. The RAM 6 is accessed by tone color data as an address. However, in practice, the RAM 6 is accessed by an output from a selector 12 as an address, as will be described later. One storage area of the RAM 6 stores a reference value upon calculation of an LFO output value, and the reference value is outputted for a given tone color when, e.g., a vibrato effect is added to a tone of the given tone color. This reference value will be referred to as an output reference value hereinafter. The output reference value is updated at predetermined time intervals. For example, the output reference value is accumulative effect data which is sequentially incremented at predetermined time intervals. A storage area (10 bits) of an address "0" of the RAM 6 stores an output reference value for the first tone color. Storage areas (each having 10 bits) of the remaining addresses "1" to "7" of the RAM 6 similarly store output reference values for the second to eighth tone colors, respectively.

Reference numeral 7 denotes the counter for frequency-dividing a master clock $\phi$, and cyclically outputting values between "0" to "15" in decimal notation. The value of the counter 7 is used as channel data for specifying a channel. The counter 7 is a 4-bit counter, and is synchronized with an address bus and a data bus. In the electronic musical instrument of this embodiment, when the value of the counter 7 is "0", processing for the first channel is executed, when it is "1", processing for the second channel is executed, . . . , and when it is "15", processing for the sixteenth channel is executed. That is, processing operations of the respective channels are time-divisionally executed on the basis of the values of the counter 7. In output signals C0 to C3 (4 bits) of the counter 7, the C0 side is defined as a lower bit, and the C3 side is defined as an upper bit.

The output signals C0 to C3 from the counter 7 are inputted to address terminals A0 to A3 of the RAM 3. The output signals C0 to C2 corresponding to the lower 3 bits of the counter 7 are inputted to address terminals A0 to A2 of the RAMs 1, 4, and 5.

The reason why only the lower 3 bits of the output signals of the counter 7 are inputted to the RAMs 1, 4, and 5 is that data to be stored in these RAMs are data in units of tone colors, and these RAMs need only be accessed for 8 stages in units of colors (data for 8 voices).

Chip select terminal CS of the RAMs 1 to 5 receive a chip select signal via the address bus. In practice, a signal on the address bus (a plurality of bits) is decoded to generate the chip select signal. In order to externally write parameter data, input terminals D1 of the RAMs 1 to 5 are connected to the data bus.

Write signal terminals WR of the RAMs 1 to 5 receive a write signal. A description "0, 1/4" as a write signal in FIG. 1 represents input timings of the write signal.

In the electronic musical instrument of this embodiment, "0" to "15" are cyclically counted by the output signals C0 to C3 from the counter 7. A clock signal CL having a frequency four times a frequency of the LSB signal C0 from the counter 7 will be defined as a clock signal having a shortest interval in this electronic musical instrument. For example, the master clock $\phi$ is determined as the clock signal CL, and the signals C0, C1, . . . of the counter 7 may be generated by frequency-dividing the frequency of the master clock $\phi$ to 1/4, 1/8, . . . . A description "X, Y/4" in FIG. 1 represents that signals are inputted at Xth and Yth timings of intervals obtained by equally dividing a pulse interval (a time interval 1/2 the period of the signal C0) of the LSB signal C0 of the counter 7 into four intervals in accordance with the clock signal CL. Note that X and Y have a value between "0" to "3". For example, since a write signal inputted to the write signal terminals WR of the RAMs 1 to 5 has a description "0, 1/4", write signals are inputted at the 0th and 1st timings of equally divided four intervals according to the clock signal CL. Similarly, a description "1/4" represents the 1st timing of the clock signal CL.

In FIG. 1, output terminals D0 of the RAMs 1 to 6 are inputted to predetermined circuits, respectively.

Reference numeral 8 denotes a carry signal generator for generating a carry signal for a full adder 9; 9, the full adder; 10, a random number generator; 11, a selection circuit; 12, the selector; 13, a latch; 14, a waveform formation logic; 15, a latch, 16, a multiplier; and 17, a selector.

A loop circuit 18 constituted of the RAM 6, the latch 13, the full adder 9, and the selection circuit 11 plays the same role as a shift register in a conventional LFO. Although the conventional shift register has storage areas in each channels, the LFO of this embodiment has storage areas in units of tone colors, and the capacity of the RAM 6 can be smaller than that of the conventional shift register.

Loop processing of the loop circuit 18 will be described below.

Output data (output reference value) from the RAM 6 is stored in the latch 13. The storage timing is "0/4", i.e., the 0th timing of the clock signal CL. This latch data is inputted to a terminal B of the full adder 9. A terminal A of the full adder 9 receives data of all "0"s. A carry terminal CI of the full adder 9 receives a carry signal from the carry signal generator 8. The carry signal generator 8 generates a carry signal at a timing according to data LFO SPEED outputted from the RAM 5. The carry signal generator 8 generates the carry signals at shorter time intervals as the data LFO SPEED have larger values. When the carry signal is inputted, the full adder 9 increments data inputted at the terminal B. All "1" input data and carry signal to C1 cause the full adder 9 to output all "0" signal. When no carry signal is inputted, the full adder 9 directly outputs data inputted at the terminal B.

The output data from the full adder 9 is inputted to the terminal B of the selection circuit 11. The selection circuit 11 receives a signal (LFO START) indicating whether or not the LFO is enabled from the RAM 4, and also receives an output waveform number (LFO WAVE SELECT No.) of the LFO from the output terminal D0 of the RAM 1. When the LFO is disabled, the signal LFO START is "0". In this case, the selection circuit 11 does not output any data, and the RAM 6 is not rewritten. When the LFO is enabled, the signal LFO START is "1". In this case, the selection circuit 11 selects random number data at the terminal A or output data from the full adder 9 at the terminal B on the basis of data LFO WAVE SELECT No. outputted from the RAM 1, and outputs the selected data.

More specifically, when the data LFO WAVE SELECT No. is $(00)_2$, $(01)_2$ or $(10)_2$, i.e., when a selected waveform is a sawtooth wave, a rectangular wave, or a triangular wave, the selection circuit 11 selects output data from the full adder 9, and outputs the selected data to the RAM 6. When the LFO WAVE SELECT No. is $(11)_2$, i.e., when a selected waveform is a random number, the selection circuit 11 selects output data from the random number generator 10, and outputs the selected data to the RAM 6. Note that the random number generator 10 outputs a new random number at a generation timing of the carry signal from the carry signal generator 8.

The output data from the selection circuit 11 is inputted to the RAM 6. Since a timing of a write signal inputted to the write signal terminal WR of the RAM 6 is "3/4", the output data from the selection circuit 11 is written at a predetermined address of the RAM 6 at the 3rd timing of the clock signal CL.

As described above, data at a predetermined address of the RAM 6 is stored in the latch 13 at the 0th timing of the clock signal CL, this data loops the loop circuit 18, and new data is written at the same address of the RAM 6 at the 3rd timing of the clock signal CL. In this manner, the RAM 6 plays the same role as a shift register of a conventional LFO.

The selector 12 selects and outputs a read/write address of the RAM 6. The terminal A of the selector 12 receives data VOICE NUMBER from the RAM 2. The data VOICE NUMBER is tone color data representing a tone color assigned to a channel specified by the value of the counter 7. A terminal B of the selector 12 receives the lower 3 bits C2 to C0 of the counter 7. The selector 12 outputs the data VOICE NUMBER inputted at the terminal A to the address terminals A2 to A0 of the RAM 6 at the 1st and 2nd timings of the clock sinal CL. In addition, the selector 12 outputs the counter values C2 to C0 at the terminal B to the address terminals A2 to A0 of the RAM 6 at the 0th and 3rd timings of the clock signal CL. Therefore, in the loop processing of the above-mentioned loop circuit 18, data is read out from the RAM 6 using the signals C2 to C0 from the counter 7 as an address at the 0th timing of the clock signal CL. At the 3rd timing, new data is written in an area at the corresponding address of the RAM 6. Since the signals C2 to C0 from the counter 7 are sequentially counted up (i.e., are circulated between "0" to "7"), data (output reference values) stored in the eight areas of the RAM 6 are equally updated according to a count-up operation of the counter 7.

At the 1st and 2nd timings of the clock signal CL, data VOICE NUMBER read out from the RAM 2 is outputted from the selector 12 to the RAM 6. Therefore, data using the data VOICE NUMBER as an address, i.e., an output reference value for tone color data assigned to a channel specified by the value of the counter 7 at that time, is outputted from the RAM 6. The output reference value outputted from the RAM 6 is inputted to the waveform formation logic 14.

The output reference value inputted to the waveform formation logic 14 merely indicates an amplitude of a sawtooth wave or a random number at a given sampling point. The waveform formation logic 14 forms a triangular wave or a rectangular wave on the basis of the output reference value from the RAM 6. A waveform to be formed is fixed by data LFO WAVE SELECT No. outputted from the RAM 1. The output from the waveform formation logic 14 is stored in the latch 15. A storage timing of the latch 15 is "1/4", i.e., the 1st timing of the clock signal CL.

The output data from the latch 15 is inputted to the multiplier 16. The multiplier 16 accumulates the input latch data and data LFO DEPTH in each of channels, which is outputted from the RAM 3, and outputs a final LFO output value (LFO SIGNAL OUT).

Terminals A0 to A2 of the selector 17 receive the lower 3 bits C0 to C2 of the counter 7. Terminals B0 to B2 of the selector 17 receive data VOICE NUMBER outputted from the RAM 2. A terminal SA of the selector 17 receives signals at "0, 3/4" timings of the clock signal CL. Therefore, the selector 17 outputs the signals C0 to C2 from the counter 7 at the 0th and 3rd timings of the clock signal CL, and outputs the data VOICE NUMBER at the 1st and 2nd timings of the clock signal CL. The output from the selector 17 is inputted to the address terminals A0 to A2 of the RAM 1. Therefore, data are read out from the RAM 1 using the signals C0 to C2 from the counter 7 as an address at the 0th and 3rd timings of the clock signal CL, and are also read out from the RAM 1 using tone color data assigned to a channel specified by the value of the counter 7 as an address at the 1st and 2nd timings.

With the above arrangement, processing based on data VOICE NUMBER is executed at the 1st and 2nd timings of the clock signal CL, and the processing result is outputted. At other timings, i.e., at the 0th and 3rd timings, automatic loop processing is executed.

Figure 2:
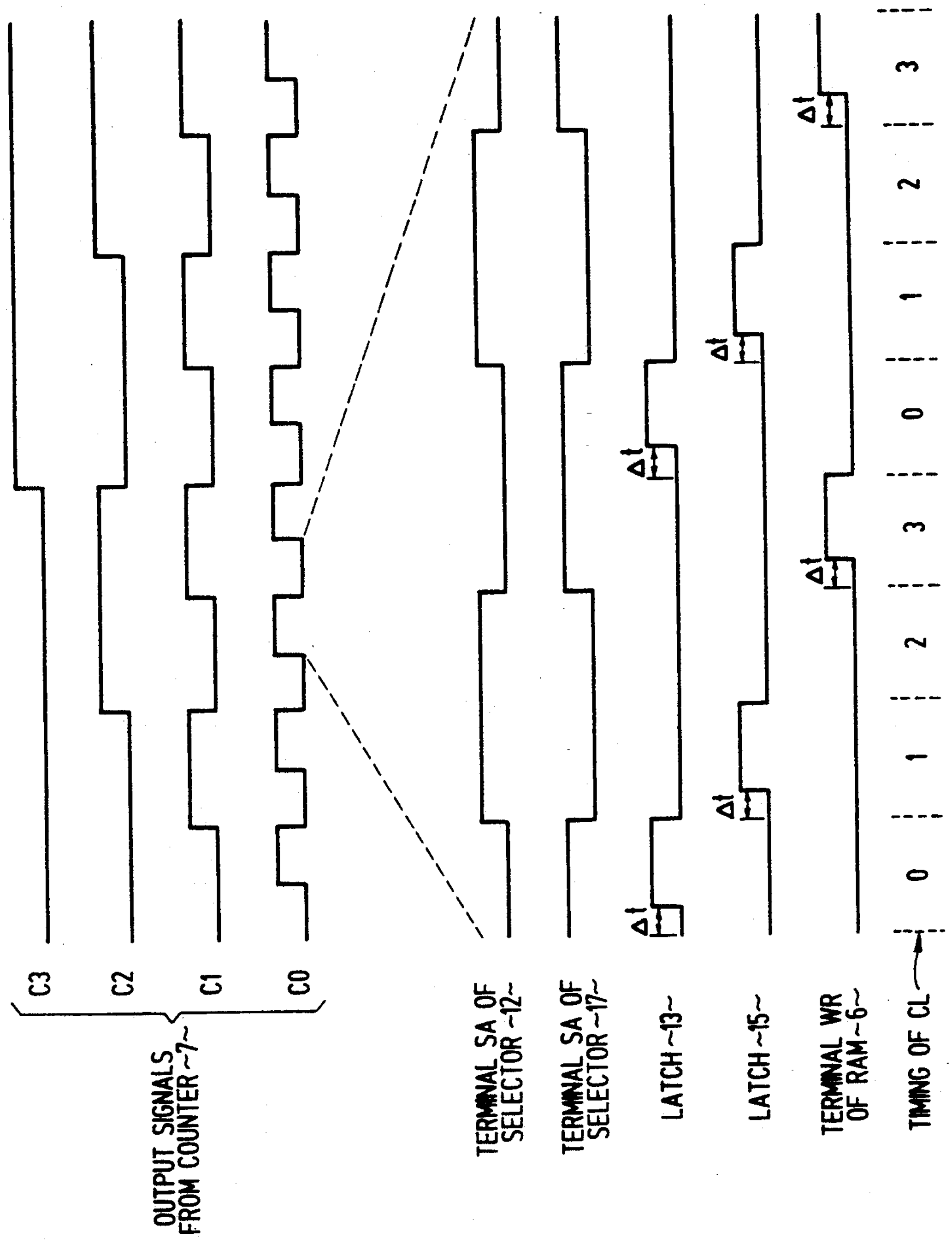
FIG. 2 is a timing chart of principal signals in the circuit shown in FIG. 1.

FIG. 2 is a timing chart showing principal signals in the block diagram of FIG. 1.

As described above, C0 to C3 designate output signals from the counter 7. A portion of the LSB signal C0 (two pulse intervals when the value of the counter 7 is $(0101)_2$ and $(0110)_2$) is enlarged to show a timing chart of other signals at, e.g., the terminal SA of the selector 12. Numerical values in the lowermost column of FIG. 2 indicate the order of timings of intervals obtained by equally dividing the pulse interval of the signal C0 into four intervals according to the clock signal CL.

Operations at four timings, i.e., the 0th to 3rd timings of the clock signal CL will be described below with reference to FIGS. 1 and 2. Operations at the 0th and 3rd timings will be described below.

(i) 0th Timing of Clock CL

The terminal SA of the selector 12 is "0" at the 0th timing. Therefore, at the 0th timing, the lower 3 bits C2 to C0 of the counter 7 are inputted to the RAM 6 as an address. Thus, data (output reference value for a given tone color) at the corresponding address of the RAM 6 is outputted from the terminal D0. The latch 13 stores output data from the RAM 6 at the 0th timing, as shown in FIG. 2. In order to guarantee an operation, the latch 13 performs a latch operation after an elapse of a delay time Δt from the beginning of the 0th timing of the clock signal CL. In this manner, the output reference value as output data from the RAM 6 using the lower 3 bits C2 to C0 of the counter 7 as an address is stored in the latch 13.

(ii) 3rd Timing of Clock CL

The terminal SA of the selector 12 is "0" at the 3rd timing. Therefore, at the 3rd timing, the lower 3 bits C2 to C0 of the counter 7 are inputted to the RAM 6 as an address. The write signal terminal WR of the RAM 6 is "1" at the 3rd timing. Therefore, at the 3rd timing, an output from the selection circuit 11 is written in a storage area of the RAM 6, which area is addressed by the lower 3 bits C2 to C0 of the counter 7. Note that the data latched by the latch 13 at the 0th timing is already looped in the loop circuit 18 before the next 3rd timing. Therefore, at the 3rd timing, new, updated write data is prepared in the selection circuit 11. The kinds of data prepared in the selection circuit 11 have already been described above with reference to FIG. 1.

As described above, at the 0th and 3rd timings, the output reference values of the RAM 6 corresponding to eight words in units of tone colors are updated. The counter 7 is cyclically counted up between "0" to "15". Each pulse interval based on the value of the counter 7 has the 0th and 3rd timings. Upon operation of the loop circuit 18 at the 0th and 3rd timings, data in a storage area of the RAM 6 specified by the lower 3 bits of the counter 7 is updated. Therefore, the output reference values in the storage areas of the RAM 6 are updated twice in one cycle of the counter 7. The processing operations at the 0th and 3rd timings described above are automatically executed regardless of tone colors.

Operations at the 1st and 2nd timings will be described below.

(iii) 1st Timing of Clock CL

The terminal SA of the selector 17 is "0" at the 1st timing. Therefore, at the 1st timing, output data from the RAM 2 is inputted to the RAM 1 as an address. The RAM 2 outputs data VOICE NUMBER using the value of the counter 7 as an address. The data VOICE NUMBER outputted from the RAM 2 specifies a tone color assigned in advance to a channel corresponding to the value of the counter 7. In this manner, data (LFO WAVE SELECT No.) is read out from the RAM 1 using the data VOICE NUMBER as an address. The readout data LFO WAVE SELECT No. is inputted to the selection circuit 11 and the waveform formation logic 14.

The terminal SA of the selector 12 is "1" at the 1st timing. Therefore, at the 1st timing, the selector 12 outputs input data at the terminal A. The address terminals A2 to A0 of the RAM 6 receive the data VOICE NUMBER for specifying a tone color. The write signal terminal WR of the RAM 6 is "0" at the 1st timing. Therefore, the output reference value is read out from the RAM 6 using the data VOICE NUMBER as an address at the 1st timing. The output reference value is a value for a tone color assigned to a channel corresponding to the value of the counter 7. This output reference value indicates an amplitude value of a sawtooth wave at each sampling point.

The output reference value is inputted to the waveform formation logic 14. The waveform formation logic 14 calculates an output value considering an output waveform of the LFO (e.g., a triangular wave or a rectangular wave) on the basis of the output reference value, and outputs the calculated waveform to the latch 15.

The latch 15 stores this output value at the 1st timing, as shown in FIG. 2. In this case, in order to guarantee an operation, the latch 15 performs a latch operation after an elapse of a delay time Δt from the beginning of the 1st timing of the clock signal CL. In this manner, the output value of the LFO for the tone color assigned to the channel specified by the value of the counter 7 is stored in the latch 15.

(iv) 2nd Timing of Clock CL

At the 2nd timing of the clock signal CL, latch data in the latch 15 is stable. The latch data in the latch 15 is inputted to the multiplier 16. The multiplier 16 multiplies the input latch data, and data LFO DEPTH in units of channels, which is outputted from the RAM 3, and outputs a final LFO output value.

As described above, the LFO output value (LFO SIGNAL OUT) for the tone color assigned to the channel corresponding to the value of the counter 7 is outputted at the 1st and 2nd timings.

Figure 3:
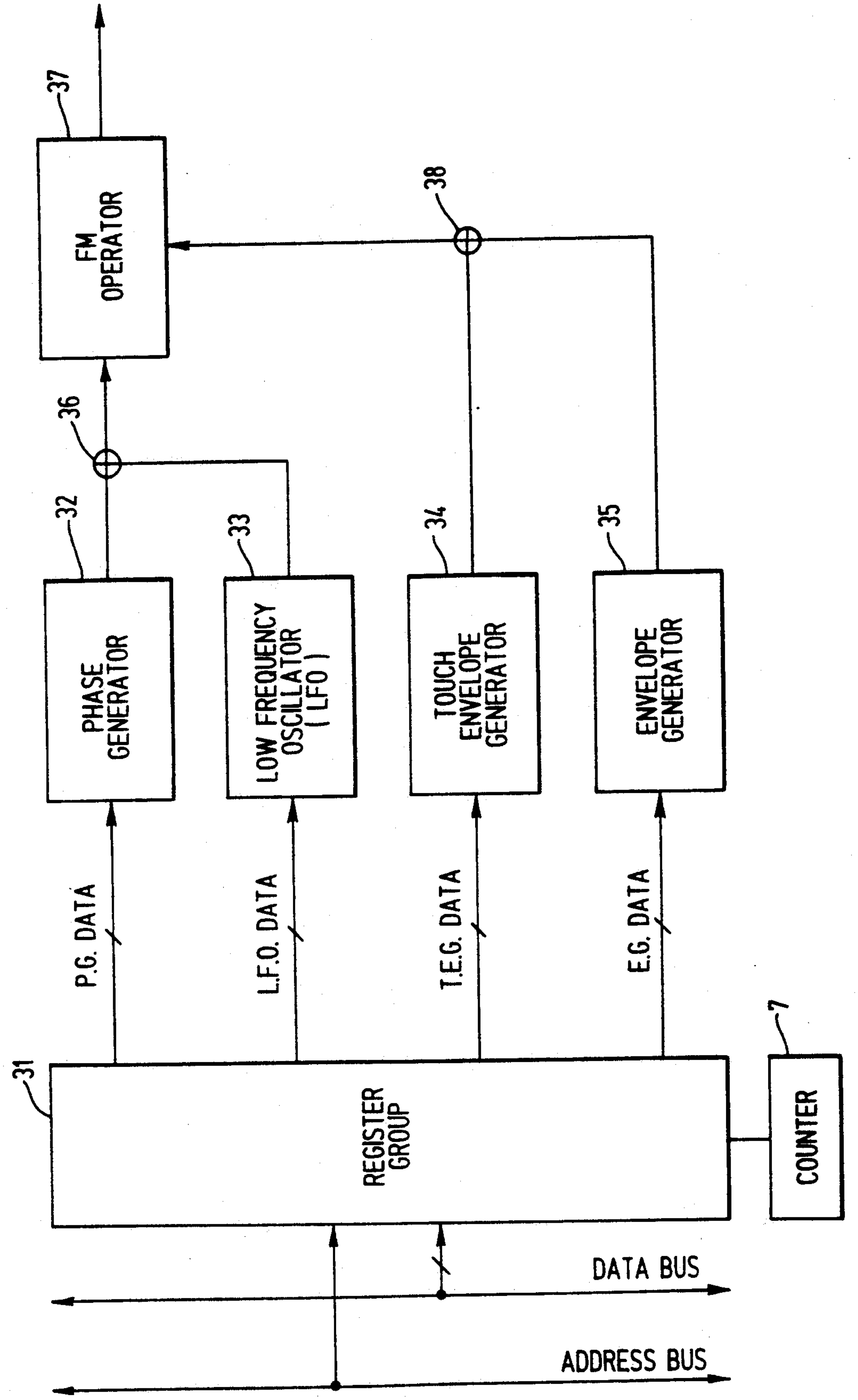
FIG. 3 is a block diagram of a frequency modulation (FM) sound source circuit assembled with the LFO shown in FIG. 1.

FIG. 3 is a schematic block diagram of an FM sound source circuit assembled with the LFO shown in FIG. 1.

In FIG. 3, reference numeral 31 denotes a register group; 32, a phase generator; 33, an LFO; 34, a touch envelope generator; 35, an envelope generator; 36, an adder; 37, an FM operator; and 38, an adder.

The circuit shown in FIG. 1 corresponds to the LFO 33, a portion of the register group 31, the address bus, and the data bus shown in FIG. 3. More specifically, the register group 31 shown in FIG. 3 includes the RAMs 1 to 5, and the selector 17 shown in FIG. 1. The LFO 33 corresponds to a portion excluding the RAMs 1 to 5, the selector 17, and the counter 7 from the circuit shown in FIG. 1. Data LFO DATA as an input to the LFO 33 in FIG. 3 represents the data LFO WAVE SELECT No., VOICE NUMBER, LFO DEPTH, LFO START, and LFO SPEED in FIG. 1.

In the FM sound source circuit shown in FIG. 3, the phase generator 32 receives phase generation data PG DATA from the register group 31, and generates corresponding phase data at regular time intervals. For example, the phase data has a value obtained by repetitively adding a constant proportional to a frequency of a depressed key at predetermined time intervals. The phase generator 32 outputs the phase data in synchronism with the counter 7. More specifically, the phase generator 32 sequentially outputs phase data for the 16 channels in one cycle of the counter 7, and then sequentially outputs updated phase data for the 16 channels in another cycle of the counter 7. The phase generator 32 repeats these operations.

The LFO 33 receives low-frequency generation data LFO DATA from the register group 31, and generates corresponding LFO output values at regular time intervals, as described above. The LFO 33 generates the LFO output values for the respective channels in synchronism with the counter 7. The LFO output values correspond to tone colors assigned to the respective channels, and have the same value (i.e., are in phase with each other) for channels to which the same tone color is assigned.

The adder 36 adds the phase data outputted from the phase generator 32 to the LFO output value outputted from the LFO 33 in units of channels. The sum is inputted to the FM operator 37.

The envelope generator 35 receives data EG DATA for generating envelope data from the register group 31, and generates corresponding envelope data at regular time intervals. The envelope generator 35 outputs envelope data for the respective channels in synchronism with the counter 7 like in the phase generator 32.

The touch envelope generator 34 receives data TE DATA for generating touch envelope data from the register group 31, and generates corresponding touch envelope data at regular time intervals. The touch envelope generator 34 outputs touch envelope data for the respective channels in synchronism with the counter 7 like in the phase generator 32.

The adder 38 adds the envelope data outputted from the envelope generator 35 to the touch envelope data outputted from the touch envelope generator 34. The sum becomes envelope data including touch data for each channel. This sum is inputted to the FM operator 37.

When no output is available from the LFO 33, phase data outputted from the phase generator 32 is directly inputted to the FM operator 37. The FM operator 37 reads out data from an internal musical tone waveform memory using the phase data as an address. Each of the sequentially outputted phase data has a value obtained by repetitively accumulating a predetermined value. The musical tone waveform memory stores amplitudes of a waveform of a musical tone to be generated at sequential sampling points. Therefore, the amplitudes of a waveform of a musical tone at sampling points are sequentially read out using the phase data sequentially outputted from the phase generator 32 as addresses.

The FM operator 37 controls and outputs the readout amplitudes at the sampling points on the basis of the envelope data inputted from the adder 38. Thus, an envelope-controlled musical tone signal for each channel is outputted from the FM operator 37.

When an output is available from the LFO 33, the sum of the phase data outputted from the phase generator 32 and the LFO output value outputted from the LFO 33 is inputted to the FM operator 37. The phase data serves as a read address of the musical tone waveform memory, as described above. In this case, since the LFO output value is added to the phase data, the read address is periodically changed. More specifically, the value of the phase data is periodically increased/decreased according to the LFO output value, and the FM operator 37 reads out data from the musical tone waveform memory using the sum as an address. Furthermore, the FM operator 37 envelope-controls the readout amplitude data, and outputs a musical tone signal. Since an address used for reading out data from the musical tone waveform memory is periodically changed, a vibrato effect is added to the musical tone signal.

The electronic musical instrument shown in FIG. 3 provides a vibrato effect by frequency-modulating phase data outputted from the phase generator 32 based on the output from the LFO 33. Alternatively, a musical tone signal outputted from the operator of the FM sound source may be amplitude-modulated by the LFO.

Figure 4:
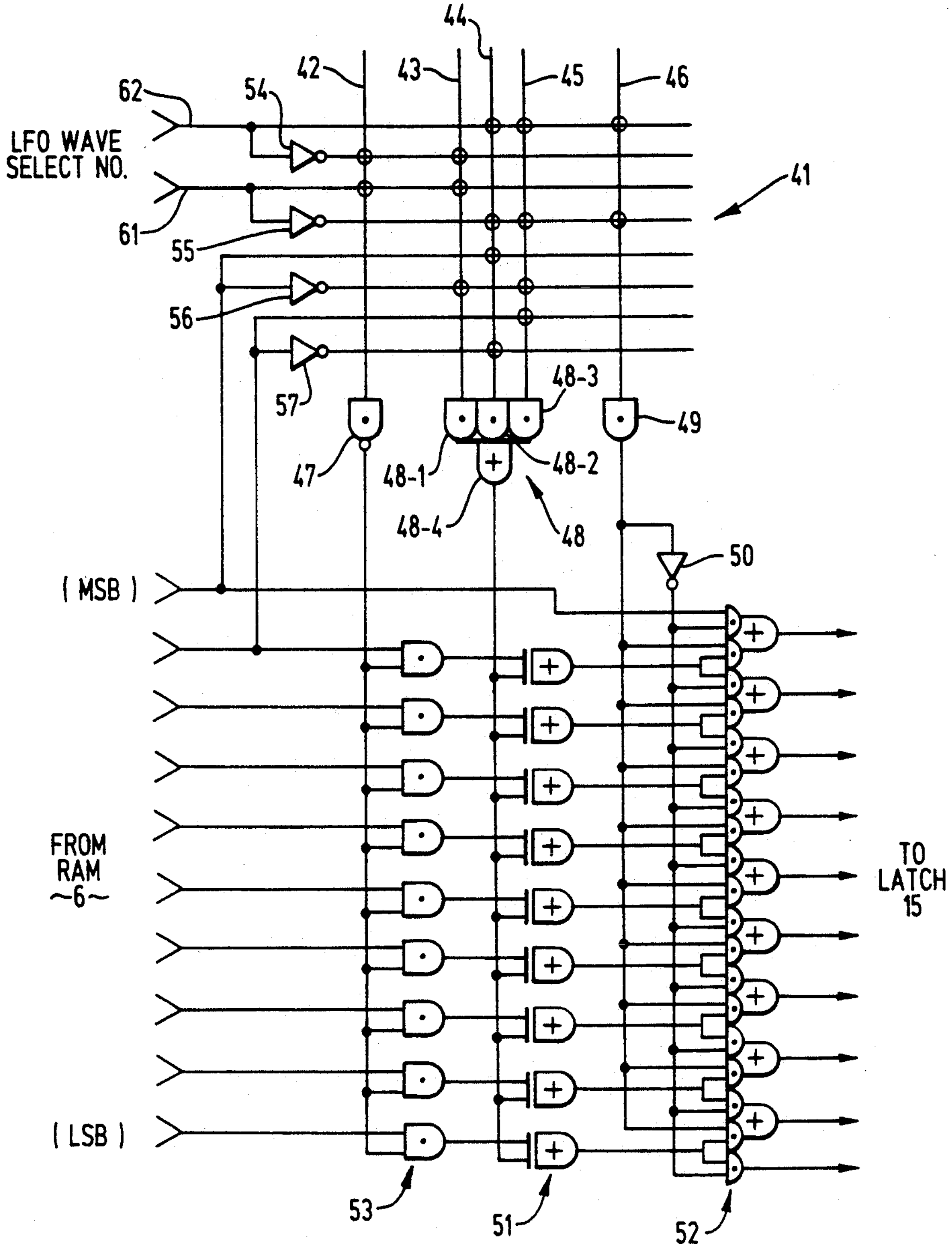
FIG. 4 is a detailed circuit diagram of a waveform formation logic 14 shown in FIG. 1.

FIG. 4 is a detailed circuit diagram of the waveform formation logic 14 shown in FIG. 1. Reference numeral 41 denotes a decoder section. Reference numeral 61 denotes a signal line for the lower bit of data LFO WAVE SELECT No.; and 62, a signal line for the upper bit thereof. Reference numeral 42 denotes an input signal line to a NAND gate 47. Reference numeral 43 denotes an input signal line to an AND gate 48-1; 44, that to an AND gate 48-2; 45, that to an AND gate 48-3; and 46, that to an AND gate 49. Signal lines crossing on circles on the signal line 42 serve as inputs to the NAND gate 47. The same applies to circles on the signal lines 43 to 46.

The upper bit 62 of data LFO WAVE SELECT No. is inputted to the AND gates 48-2, 48-3, and 49. A bit obtained by inverting the upper bit 62 of the data LFO WAVE SELECT No. by an inverter 54 is inputted to the NAND gate 47 and AND gate 48-1. The lower bit 61 of the data LFO WAVE SELECT No. is inputted to the NAND gate 47 and AND gate 48-1. A bit obtained by inverting the lower bit 61 of the LFO WAVE SELECT No. by an inverter 55 is inputted to the AND gates 48-2, 48-3, and 49.

The MSB of the 10-bit input data from the RAM 6 is inputted to the AND gate 48-2. A bit obtained by inverting the MSB by an inverter 56 is inputted to the AND gates 48-1 and 48-3. The 2nd bit from the MSB of the 10-bit input data from the RAM 6 is inputted to the AND gate 48-3. A bit obtained by inverting the 2nd bit by an inverter 57 is inputted to the AND gate 48-2.

Lower 9 bits of the 10-bit input data from the RAM 6 are inputted to nine AND gates 53, respectively. The nine AND gates 53 receive the output signal from the NAND gate 47. The output signals from the nine AND gates 53 are inputted to nine EX-OR gates 51, respectively. The output signals from the AND gates 48-1, 48-2 and 48-3 are inputted to an OR gate 48-4, and the output signal from the OR gate 48-4 is inputted to the nine EX-OR gates 51.

The MSB from the RAM 6, the output signals from the nine EX-OR gates 51, the output signal from the AND gate 49, and a signal obtained by inverting the output from the AND gate 49 by an inverter 50 are inputted to a circuit 52 obtained by combining AND gates and OR gates, as shown in FIG. 4, thus generating an input signal to the latch 15. The output date (10 bits) from the waveform formation logic to latch 15 is treated as signed data. When the MSB of the output data is $(1)_2$, the output data is negative in two's-complement form.

The operation of the waveform formation logic will be described below.

When the data LFO WAVE SELECT No. is $(00)_2$ or $(11)_2$, the output from the NAND gate 47 is $(1)_2$. In this case, the outputs from the AND gates 48-1, 48-2, 48-3, and 49 are respectively $(0)_2$, and the output from the OR gate 48-4 is $(0)_2$. Data $(1)_2$ is inputted from the NAND gate 47 to the nine AND gates 53, and data $(0)_2$ is inputted from the OR gate 48-4 to the nine EX-OR gates 51. Therefore, the lower 9 bits inputted from the RAM 6 directly appear at the output terminals of the nine EX-OR gates 51. The output from the AND gate 49 is inverted by the inverter 50, and $(1)_2$ is inputted to the circuit 52. Thus, a sawtooth wave or a random number inputted from the RAM 6 is directly outputted.

When the data LFO WAVE SELECT No. is $(01)_2$, i.e., when a rectangular wave is designated as an output waveform of the LFO, the signal line 62 is $(0)_2$, and the signal line 61 is $(1)_2$. Therefore, both the two inputs of the NAND gate 47 become $(1)_2$, and the output from the NAND gate 47 becomes $(0)_2$. Therefore, data $(0)_2$ is inputted to the nine AND gates 53. The nine AND gates 53 always output $(0)_2$ to the nine EX-OR gates 51, respectively. Since the data LFO WAVE SELECT No. is $(01)_2$, the outputs from the AND gates 48-2, 48-3, and 49 are always $(0)_2$ but never become $(1)_2$. The output from the AND gate 49 is inverted by the inverter 50, and $(1)_2$ is inputted to the circuit 52. When the MSB of the input data from the RAM 6 is $(0)_2$, i.e., when the input data is $(000\ldots0)_2$ to $(011\ldots1)_2$, the AND gate 48-1 outputs $(1)_2$, the OR gate 48-4 outputs $(1)_2$, and the nine EX-OR gates 51 output $(1)_2$. The output from the circuit 52 to the latch 15 is (011 . . . 1). When the MSB of the input data from the RAM 6 is $(1)_2$, i.e., when the input data is $(100\ldots0)_2$ to $(111\ldots1)_2$, the AND gate 481 outputs $(0)_2$, the OR gate 48-4 outputs $(0)_2$, and the nine EX-OR gates 51 output $(0)_2$. The output from the circuit 52 to the latch 15 is (100 . . . 0). In this manner, a rectangular wave is outputted.

When the data LFO SELECT WAVE No. is $(10)_2$, the output from the AND gate 49 becomes $(1)_2$. Therefore, the LSB of the output signal to the latch 15 always becomes $(0)_2$. The MSB of the input signal from the RAM 6 is inputted to one AND gate of the combination circuit 52. In this case, since $(0)_2$ is always inputted to this AND gate from the inverter 50, the MSB of the input signal from the RAM 6 is always ignored. The output from the NAND gate 47 is $(1)_2$, and data $(1)_2$ is inputted from the NAND gate 47 to the nine AND gates 53. Therefore, the nine AND gates 53 directly output the lower 9 bits of the input signal from the RAM 6 to the nine EX-OR gates 51, respectively. When the input signal (10 bits) from the RAM 6 is $(000\ldots0)_2$ to $(001\ldots1)_2$, the AND gates 48-2 and 48-3 output $(0)_2$, and the OR gate 48-4 also outputs $(0)_2$. Therefore, the EX-OR gates 51 directly output input signals (the lower 9 bits inputted from the RAM 6). The combination circuit 52 adds 1 bit $(0)_2$ as the LSB and outputs 10 bits data as the output signals, thus outputting these signals to the latch 15. As described above, a leading edge portion of a triangular wave is outputted.

When the value of the input data from the RAM 6 is increased and is $(010\ldots0)_2$ to $(011\ldots1)_2$, the AND gate 48-2 outputs $(0)_2$, the AND gate 48-3 outputs $(1)_2$, and the OR gate 48-4 outputs $(1)_2$. Therefore, the EX-OR gates 51 invert the input signals (the lower 9 bits inputted from the RAM 6) and output the invented signals (9 bits). More specifically, the EX-OR gates 51 output values of $(01\ldots1)_2$ to $(00\ldots0)_2$ which are sequentially decreased. The combination circuit 52 adds 1 bit $(0)_2$ as the LSB and outputs 10 bit data as the output signals, thus outputting these signals to the latch 15. As described above, a trailing edge portion of a triangular wave is outputted.

When the value of the input data from the RAM 6 is further increased, a negative range of a sawtooth wave is similarly inverted and folded to form a triangular wave.

As described above, according to the present invention, since a RAM is used in place of a conventional shift register as a storage device of the LFO, effect data such as LFO data can be outputted at desired timings, and an effect, e.g., a vibrato effect corresponding to a tone color series can be realized with a simple arrangement.

What is claimed is:

1. An electronic musical instrument capable of imparting an in-phase musical effect to plural musical tones having like tone color comprising:

- a plurality of tone generation channels, the channels being processed in time-divisionally executed fashion;
- memory means for storing voice numbers, each of said voice numbers specifying a tone color assigned to a musical tone to be generated by each of said channels;
- random-access memory means for storing reference values, each of said reference values corresponding to a tone color specified by each of the voice numbers;
- means for sequentially updating each of the reference values stored in the random-access memory means at regular time intervals, so that each of the reference values represents an amplitude value of a low-frequency signal;
- means for reading out a voice number of a tone generation channel at a time slot of the channel;
- means for reading out the amplitude value from the random-access memory means according to the readout voice number at the time slot of the channel; and
- means for adding the musical effect to the musical tone to be outputted from the channel using the readout amplitude value;
- wherein an in-phase musical effect is added to the musical tones having the same tone color on the basis of the same amplitude value being outputted from said random-access memory means.

2. An instrument according to claim 1, wherein the musical tone effect is one of a group of effects consisting of a vibrato effect, a tremolo effect, and a wow effect.

3. An instrument according to claim 1, further comprising:

- second memory means for storing type data of a waveform of the low-frequency signal; and
- waveform formation means for processing and outputting the amplitude value, so that a series of the amplitude value is outputted in accordance with a waveform specified by stored type data read out from said second memory means.

4. An instrument according to claim 3, wherein the waveform of the low-frequency signal is one of a group of waves consisting of a sawtooth wave, a rectangular wave, and a triangular wave.

5. An instrument according to claim 1, further comprising:

second memory means for storing coefficients for controlling amplitude of the waveform of the low-frequency signal; and multiplying means for multiplying the reference value read out from said random-access memory means with a coefficient read out from said second memory means, and outputting a product as the amplitude value of the low-frequency signal.

6. An instrument according to claim 1, further comprising:

second memory means for storing coefficients for controlling a frequency of the low-frequency signal; and means for increasing/decreasing the time intervals for updating the reference value in accordance with a coefficient read out from said second memory means.

7. An instrument according to claim 1, wherein the memory means stores tone color data for a given number of tone colors, the given number being less than the number of tone generation channels comprising said plurality of tone generation channels.

8. An instrument according to claim 1, further comprising:

random number generation means for outputting random number data; and means for selecting whether amplitude value of the low-frequency or random number data is used as the reference value;

wherein the random-access memory means stores the random number data as the reference value instead of the amplitude value.

9. An electronic musical instrument capable of generating musical tones having the same tone color comprising:

a plurality of tone generation channels;

memory means for storing tone color data for specifying a tone color assigned to a musical tone to be generated by each of said channels;

random-access memory means for storing musical effect data corresponding to a musical effect and for outputting effect data corresponding to a tone color specified by the memory means;

means for adding the musical effect to the musical tones to be outputted from the tone generation channels and which have the same tone color on the basis of the same effect data being outputted from said random-access memory means;

the effect data stored in said random-access memory means being sequentially updated at regular time intervals; and random number generation means for outputting random number data to said random-access memory means at regular time intervals.

10. An instrument according to claim 9, further comprising second memory means for storing coefficients for controlling the time interval for generating the random number data by said random number generation means, and wherein said random number generation means generates the random number data at time intervals according to a coefficient read out from said second memory means.

11. An instrument according to claim 9, further comprising:

second memory means for storing coefficients to be accumulated with the random number data; and accumulating means for multiplying the random number data with a coefficient read out from said second memory means, and outputting a product as effect data.

12. An electronic musical instrument capable of generating musical tones having the same tone color comprising:

a plurality of tone generation channels;

memory means for storing tone color data for specifying a tone color assigned to a musical tone to be generated by each of said channels;

random-access memory means for storing musical effect data corresponding to a musical effect and for outputting effect data corresponding to a tone color specified by the memory means;

means for adding the musical effect to the musical tones to be outputted from the tone generation channels and which have the same tone color on the basis of the same effect data being outputted from said random-access memory means;

the effect data stored in said random-access memory means being sequentially updated at regular time intervals; and means for selecting whether amplitude data of the low-frequency signal or random number data is used as the effect data.

13. An electronic musical instrument comprising:

musical tone generating means having a plurality of channels for generating musical tones;

first memory means for storing tone color data for specifying a tone color assigned to each of said channels; and shift register type musical effect imparting means for imparting a musical effect to the musical tones to be generated by the musical tone generating means, said musical effect imparting means comprising:

random access memory means for storing musical effect data to be outputted in accordance with said tone color data;

effect selecting means for selecting an effect type; and effect generating means for generating an effect signal corresponding to said effect data, the effect signal determining the musical effect to be imparted to the musical tones by the musical tone generating means.

14. An electronic musical instrument capable of imparting an in-phase musical effect to plural musical tones having like tone color comprising:

a plurality of tone generation channels;

memory means for storing voice numbers, each of the voice numbers specifying a tone color assigned to a musical tone to be generated by each of the channels;

random number generation means for outputting random number data;

random-access memory means for inputting the random number data and storing the data as a reference value at regular time intervals, the reference value corresponding to a tone color specified by the memory means; and means for adding the musical effect to the musical tones to be outputted from the tone generation channels using the reference value, wherein an in-phase musical effect is added to the musical tones having the same tone color on the basis of the same reference value being outputted from the random-access memory means.

15. An instrument according to claim 14, further comprising:

second memory means for storing coefficients to be multiplied with the reference value; and multiplying means for multiplying the reference value with a coefficient read out from the second memory means, and outputting a product.

16. An amplitude data generator for an electronic musical instrument having a plurality of tone generation channels, the processing of the respective channels being time-divisionally executed, comprising:

memory means for storing voice numbers, each of said voice numbers specifying a tone color assigned to a musical tone to be generated by each of said channels;

random-access memory means for storing amplitude values, each of said amplitude values corresponding to a tone color specified by each of said voice numbers in the memory means;

means for sequentially updating each of said amplitude values stored in the random-access memory means at regular time intervals;

means for reading out a voice number of a tone generation channel at the time slot of the channel; and means for reading out the amplitude value from the random-access memory means according to the readout voice number at the time slot of the channel, and outputting the value, wherein the same amplitude value is outputted to channels to which the same tone color is assigned.

* * * * *